Figure 1:
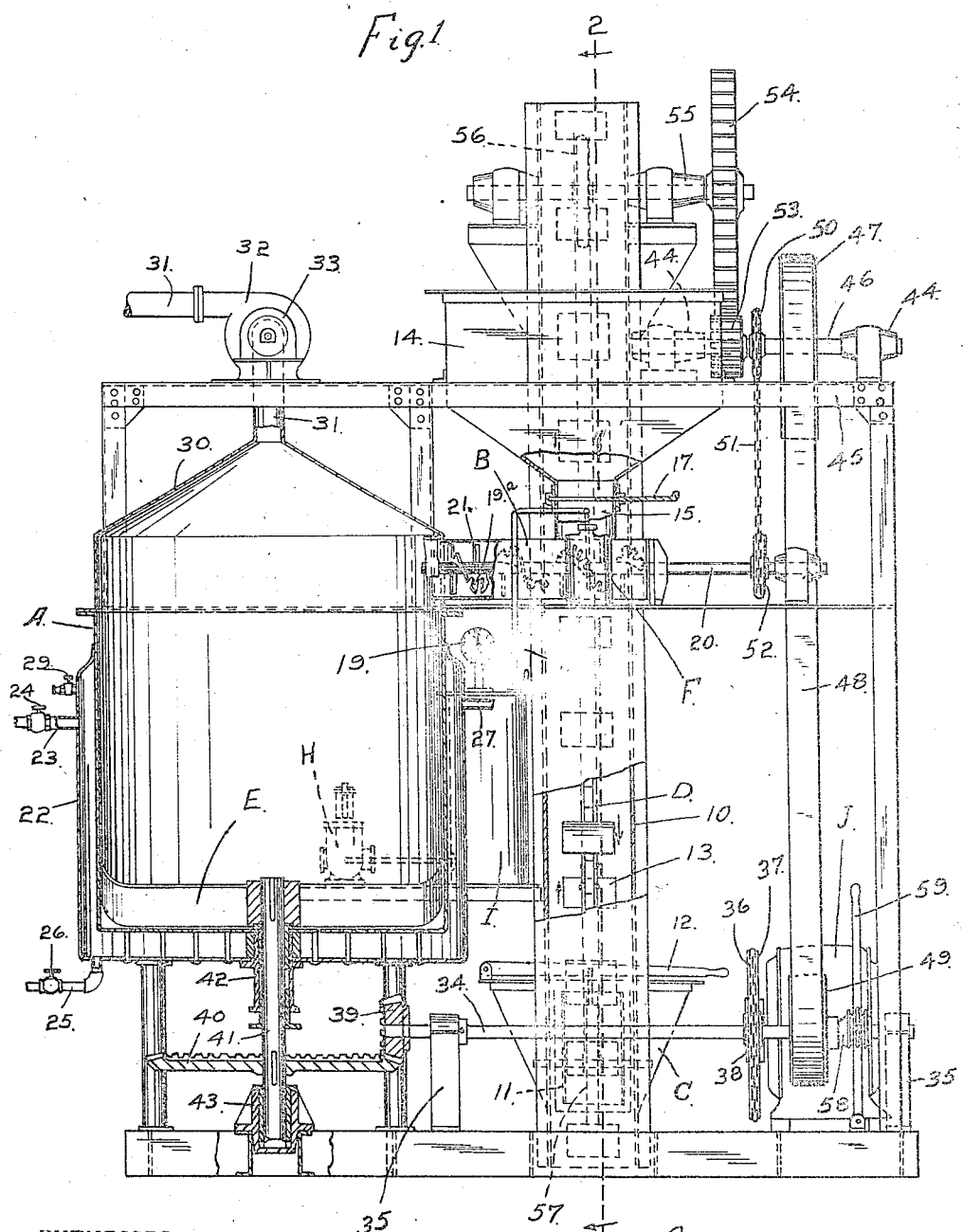

A. W. H. LENDERS.
APPARATUS FOR MAKING MODIFIED STARCHES.
APPLICATION FILED MAY 8, 1913.

1,159,591.

Patented Nov. 9, 1915.
2 SHEETS—SHEET 1.

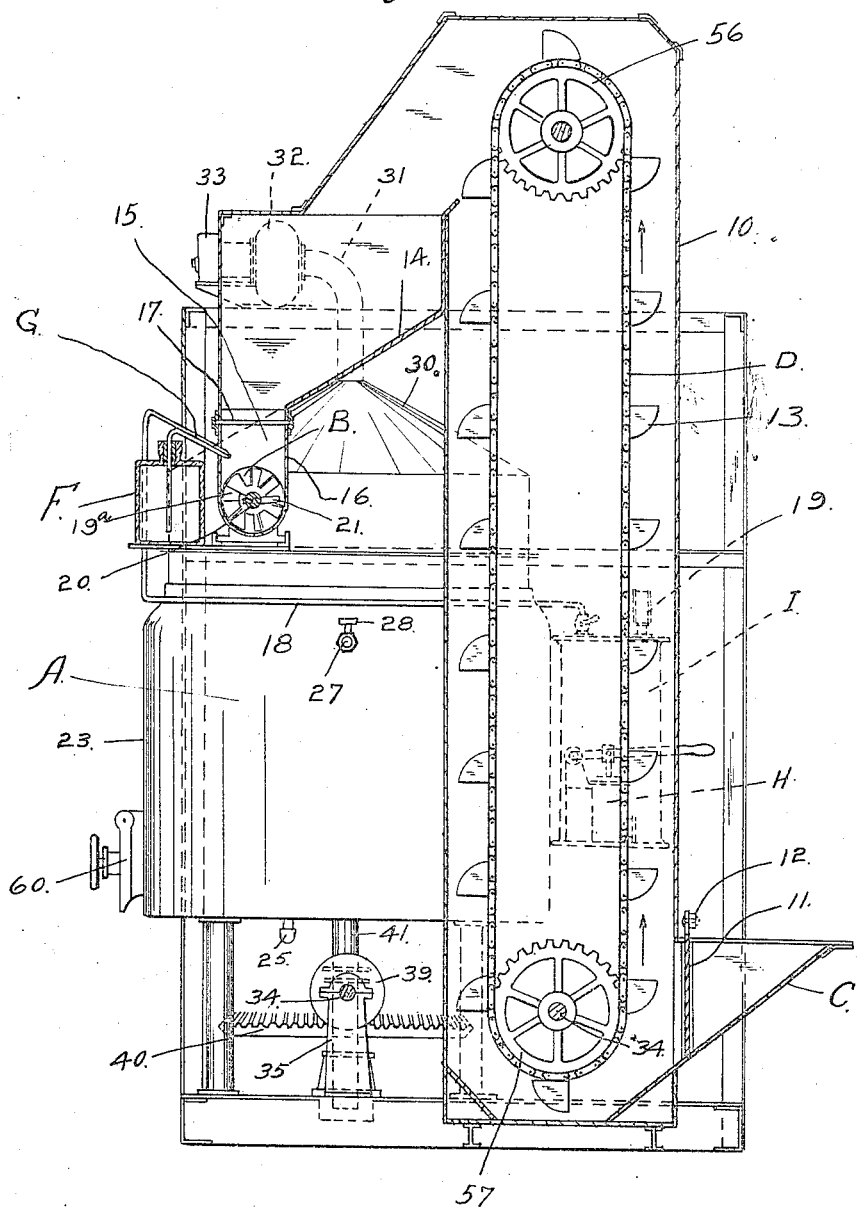

UNITED STATES PATENT OFFICE.

ADOLPH W. H. LENDERS, OF CHICAGO, ILLINOIS.

APPARATUS FOR MAKING MODIFIED STARCHES.

1,159,591. Specification of Letters Patent. Patented Nov. 9, 1915.

Application filed May 8, 1913. Serial No. 766,332.

*To all whom it may concern:*

Be it known that I, ADOLPH W. H. LENDERS, a citizen of the United States, residing at Chicago, in the county of Cook and State of Illinois, have invented certain new and useful Improvements in Apparatus for Making Modified Starches, of which the following is a specification.

My invention relates to the manufacture of modified starches such as soluble starch, thin boiling starch, dextrin, British gum, and allied products; and the invention has for one of its objects to provide a simple, compact and inexpensive apparatus for making modified starches by means of which these products can be made in relatively small quantities and by persons who are not skilled chemists or experts in this art, a specific purpose of the invention, in this regard, being to provide an apparatus which will not be costly and which will not take up much room, that can be used, for example, by a consumer of dextrin or other allied product for making the substance when and in the quantities required.

The invention has for further objects to provide an apparatus for the manufacture of modified starches, by means of which the starch and acid may be thoroughly mixed and the process of conversion carried on in such manner that the product will be uniformly converted throughout without discoloration of any part of the batch or the formation of lumps or other impurities requiring removal before the product is marketed.

A further object is to provide an apparatus for making modified starches which may be very conveniently and accurately controlled, whereby it may be employed for making either soluble starch, dextrin, British gum or any other products derived from starch by a partial conversion of the same, differing in degree according to the particular products.

The invention has for further objects the other new and improved constructions, arrangements and devices relating to the manufacture of modified starches to be hereinafter described and claimed.

The invention is illustrated in a preferred embodiment in the accompanying drawings, wherein—

Figure 1 is a side elevation of the apparatus, with certain parts in section and certain parts broken away for the better illustration of the construction and operation of said apparatus; and Fig. 2, a sectional elevation taken on line 2—2 of Fig. 1, looking in the direction of the arrows.

Like characters of reference designate like parts in the several figures of the drawings.

Referring to the drawings, my improved apparatus consists of a jacketed dextrinizing vessel A, a mixing and conveying mechanism B, which delivers into the dextrinizing vessel, a bin C into which the starch to be treated may be placed in any suitable manner, an elevator D, preferably, though not essentially, of the chain and bucket type, which transports the starch placed in the bin C and delivers the same into the conveyer and mixer B, an agitator E within the dextrinizing vessel A, a vessel F containing acid and provided with an atomizing nozzle G arranged so as to introduce acid into the starch handled by the mixing and conveying mechanism B, a pump H, an air reservoir I for operating the atomizer, and a suitable motor J, together with driving connections from the motor to the several moving parts of the apparatus and certain valves to be hereinafter described in connection with the more detailed description of the apparatus.

The elevator D is contained in a housing 10 separated from the bin C by a slide valve 11 operated by the hand lever 12. The starch in the bottom of the housing 10 is picked up by the buckets 13 of the elevator and discharged into a hopper 14 which leads to an opening 15 in the casing of the conveying and mixing mechanism B. The mouth 16 of the hopper is provided with a slide valve 17 whereby the rate of delivery of the starch to the mixing and conveying mechanism, and hence to the dextrinizing vessel A, may be regulated. The atomizer nozzle G projects into the mouth 16 of the hopper 14 so that as the starch falls in a continuous stream from a hopper to the mixer it receives a properly proportioned amount of acid.

A pipe 18 conducts compressed air from the tank I to the atomizing nozzle. The tank is preferably provided with a pressure gage 19 so that by keeping the pressure at the proper point a proper amount of acid may be delivered to the starch, having reference to the rate of delivery of the starch to the dextrinizing vessel which is controlled by the position of slide valve 17. Any suitable means may be employed for keeping up the pressure in the reservoir I. The pump H shown in the drawings is a simple hand-pump. Any suitable apparatus might be employed for conveying the acidified starch to the dextrinizing vessel. I have shown a worm conveyer, the flight 19ª of which is notched and its shaft 20 provided with blades or prongs 21. The purpose of this construction is to provide for the thorough mixing of the acid and starch during the movement of the same from the hopper 14 to the dextrinizing vessel.

The dextrinizing vessel A is provided with a jacket 22 into which the steam supply pipe 23 is fitted, having a valve 24. Leading to the bottom of the jacket is a water supply pipe 25 having a valve 26 and at the upper part of the jacket is a water outlet pipe 27 provided with a valve 28. When a batch of starch, properly acidulated and of the desired quantity, has been run into the dextrinizing vessel, steam is admitted to the jacket. The material is kept in agitation by the movement of the agitator blades E. When the conversion of the starch has been carried far enough (having reference to the particular product required) the steam is shut off and cold water admitted to the steam jacket through pipe 25, the water out-flowing through pipe 27. This sudden cooling of the material stops the conversion at the desired point. The jacket may be provided with the petcock 29. Preferably the vessel A is constructed with a hood 30 terminating in an outlet pipe 31 through which the vapors resulting from the heating of the acidulated starch may be carried off. Preferably an exhaust fan 32 operated by an electric motor 33 is interposed in the pipe 31.

The moving parts of the apparatus are driven by the motor J (which is shown as an electric motor) through the following mechanisms: 34 designates a shaft revolving in bearings in the supports 35 and carrying a sprocket wheel 36 driven by a chain 37 which extends around a sprocket wheel 38 on the armature shaft of the motor J. On one end of shaft 34 is a bevel pinion 39 which meshes with a bevel pinion 40 on a shaft 41 which extends into the dextrinizing vessel A through a suitable stuffing box 42 in the bottom of said vessel. The agitator blades E are secured to the shaft 41. The lower end of the shaft is supported in a bearing 43. Mounted in bearings 44 on the supporting framework 45 is a countershaft 46 carrying a pulley 47 which is driven by belt 48 from a pulley 49 on the shaft 34. The countershaft 46 carries a sprocket wheel 50 which drives a sprocket chain 51 extending around a sprocket wheel 52 on the shaft 20 of conveying and mixing worm. Fixed to the shaft 46 is a gear wheel 53 which meshes with a gear wheel 54 on a shaft 55, on which is fixed the upper sprocket wheel 56 of the elevator D, the lower sprocket wheel of the elevator being designated 57. The pulley 49 is loose on the shaft 34 and is coupled thereto by means of a clutch 58 which is operated by the lever 59. When the batch has been converted, it is discharged through an opening in the walls of the converting vessel which is normally closed by the door 60.

It will be seen that with the method of acidulation above described, every portion of the batch receives an equal amount of acid. Heretofore, it has been found difficult in the manufacture of dextrin, for example, to uniformly acidulate the starch and moreover to prevent the formation of lumps. As a result of lack of uniformity of acidulation and the methods heretofore used in dextrinizing the acidulated starch the degree of conversion in a given batch often varied so that the product was not uniform throughout. My method is to deliver the starch to the dextrinizing vessel at a uniform rate and to introduce into the stream of starch as it passes to the dextrinizing vessel acid in just sufficient quantity so that each particle of starch receives the required amount of acid. In order to insure this the acid is introduced, preferably, in the form of a spray, and the starch, after receiving the acid, is thoroughly mixed before it reaches the dextrinizing vessel. The steam is not turned on until the entire batch has been run into the dextrinizing vessel. The agitator keeps the material in the vessel at an even temperature. This temperature can be varied at will by control of the steam. The starch introduced into the vessel is uniformly acidulated. As a result of these conditions the product will be uniform. Also there is no difficulty in controlling the apparatus so as to obtain different degrees of conversion, that is, so as to obtain dextrin or any of the allied products, as may be desired. By shutting off the steam and immediately cooling the batch by causing cold water to run through the steam jacket the process of conversion is stopped at once. Heretofore it has been customary to bolt the finished product through reels to remove the lumps and scale formed in the converting pans. This step is obviated by my method which turns out a clear, uniform product.

Broadly speaking, my invention contemplates acidulating the starch by a continuous process by means of which the proportions as between starch and acid can be so controlled as to give uniformity of acidulation and a proper degree of acidulation while, after the starch has been acidulated, the whole batch is converted as a unit. It is not practical to have the conversion step a continuous operation, that is, one in which the product is removed from the dextrin vessel little by little and its place taken by fresh starch. This has been tried, but it has been found impossible to get a uniform product under such conditions.

My invention provides, it will be seen, an apparatus which is comparatively small and is compact in form, in which the entire operation of making dextrin or allied products may be performed. Having once learned how to set the valves, what pressure to maintain in the air and steam system, and the period that the steam should be kept turned on, the operator, even though not skilled in this art, will not have any difficulty in obtaining a uniform product.

While I have described my invention in certain preferred embodiments, it will be understood that modifications might be made without departure from the invention sought to be covered herein.

I do not claim herein the above described process, as this process is subject matter of a divisional application filed June 25, 1914, Serial No. 847,280.

I claim:

1. In apparatus for manufacturing modified starches, the combination with a jacketed dextrinizing vessel, the jacket of which is provided with a steam connection and with water connections, of a conveying and mixing mechanism adapted to deliver into said vessel, and means for introducing acid in measured quantities into the starch in said conveying and mixing mechanism.

2. In apparatus for manufacturing modified starches, the combination with a jacketed dextrinizing vessel, the jacket of which is provided with a steam connection and with water connections, of a conveying and mixing mechanism adapted to deliver into said vessel, means for introducing acid in measured quantities into the starch in said conveying and mixing mechanism, and continuously operating agitating means in said vessel.

3. In apparatus for manufacturing modified starches, the combination with a jacketed dextrinizing vessel, the jacket of which is provided with a steam connection and with water connections, of a screw conveyer and mixer adapted to deliver into said dextrinizing vessel, an elevator which delivers the starch into said conveyer, a valve to control the rate of flow into the conveyer, and an atomizing device which is adapted to deliver acid to the starch as it passes from said elevator into said conveyer.

4. In apparatus for manufacturing modified starches, the combination with a jacketed dextrinizing vessel, of means for acidifying starch and delivering the same into said vessel, and means for introducing successively steam and water into the jacket of said dextrinizing vessel for the purpose described.

5. In apparatus for manufacturing modified starches, the combination with a hopper having a valve in the bottom, a screw conveyer arranged under said valve the flight of which is notched so as to provide mixing blades, an atomizer arranged so as to spray the starch with an acid as it passes from the hopper into the conveyer, and a dextrinizing vessel arranged to receive the mixed starch and acid after passing through the conveyer.

6. In apparatus for manufacturing modified starches, the combination with a hopper having a valve in the bottom, a screw conveyer arranged under said valve the flight of which is notched so as to provide mixing blades, an atomizer arranged so as to spray the starch with an acid as it passes from the hopper into the conveyer, a dextrinizing vessel arranged to receive the mixed starch and acid after passing through the conveyer, and an agitator in said vessel, said vessel being formed with a jacket and means for successively introducing steam and water into said jacket for the purpose described.

7. In apparatus for manufacturing modified starches, the combination of a steam jacketed dextrinizing vessel having a vapor outlet, a fan to remove the vapors from said vessel through said outlet, a mixer and conveyer for starch arranged to deliver its contents into the dextrinizing vessel and an atomizing device for acid arranged to spray acid into the starch in the conveyer and mixer.

8. In apparatus for manufacturing modified starches, the combination of a dextrinizing vessel, a screw conveyer adapted to deliver its contents into said dextrinizing vessel, the flight of which is notched so as to provide mixing blades, means for continuously delivering starch to the conveyer, and an atomizing device for acid arranged to spray the starch with acid as the starch enters said conveyer.

ADOLPH W. H. LENDERS.

Witnesses:
L. A. FALKENBERG,
G. Y. SKINNER.